United States Patent
Lourenco et al.

(10) Patent No.: US 9,511,935 B2
(45) Date of Patent: Dec. 6, 2016

(54) CASCADING PROCESSOR

(75) Inventors: Jose Lourenco, Edmonton (CA);
MacKenzie Millar, Edmonton (CA)

(73) Assignees: 1304345 Alberta Ltd., Edmonton (CA);
1304338 Alberta Ltd., Edmonton (CA)

( * ) Notice: Subject to any disclaimer, the term of this patent is extended or adjusted under 35 U.S.C. 154(b) by 263 days.

(21) Appl. No.: 14/350,043

(22) PCT Filed: Oct. 4, 2011

(86) PCT No.: PCT/CA2011/050626
§ 371 (c)(1),
(2), (4) Date: Apr. 4, 2014

(87) PCT Pub. No.: WO2013/049911
PCT Pub. Date: Apr. 11, 2013

(65) Prior Publication Data
US 2014/0231313 A1 Aug. 21, 2014

(51) Int. Cl.
*C10G 1/02* (2006.01)
*B65G 11/00* (2006.01)
(Continued)

(52) U.S. Cl.
CPC ............... *B65G 11/00* (2013.01); *C01B 3/06* (2013.01); *C01B 3/44* (2013.01); *C01B 3/48* (2013.01);
(Continued)

(58) Field of Classification Search
CPC ..... B65G 11/00; F27D 21/0014; C10G 1/045; C10G 47/00; C10G 1/02; C10G 1/002; C10G 2300/42; C01B 3/06; C01B 3/44;C01B 3/48; C01B 2203/06; C01B 2203/0405; Y02E 60/36
See application file for complete search history.

(56) References Cited

U.S. PATENT DOCUMENTS 2,446,925 A  8/1948 Hemminger
2,495,613 A  1/1950 Tuttle
(Continued)

FOREIGN PATENT DOCUMENTS

CA  1098852 A1  4/1981
CA  2 515 999 A1  9/2004
(Continued)

OTHER PUBLICATIONS

International Search Report mailed Jun. 14, 2012, issued in corresponding International Application No. PCT/CA2011/050626, filed Oct. 4, 2011, 3 pages.

*Primary Examiner* — Brian McCaig
(74) *Attorney, Agent, or Firm* — Christensen O'Connor Johnson Kindness PLLC

(57) ABSTRACT

A cascading processor is described which includes a processor body having an upper inlet and a lower outlet, such that materials pass by force of gravity from inlet to the outlet. The processor body has a plurality of processing levels which are sequentially vertically spaced progressively downwardly from the inlet to the outlet, such that materials cascade by force of gravity from one processing level to another processing level as the materials pass through the processor body front the inlet to the outlet. This cascading processor was developed for recovery of bitumen front oil sands, but can be used to process oil shales or to process biomasses.

19 Claims, 4 Drawing Sheets

(51) Int. Cl.
  *C10G 47/00*    (2006.01)
  *C01B 3/06*     (2006.01)
  *C01B 3/44*     (2006.01)
  *C01B 3/48*     (2006.01)
  *C10G 1/00*     (2006.01)
  *C10G 1/04*     (2006.01)
  *F27D 21/00*    (2006.01)

(52) U.S. Cl.
  CPC ............... *C10G 1/002* (2013.01); *C10G 1/02* (2013.01); *C10G 1/045* (2013.01); *C10G 47/00* (2013.01); *F27D 21/0014* (2013.01); *C01B 2203/0405* (2013.01); *C01B 2203/06* (2013.01); *C10G 2300/42* (2013.01); *Y02E 60/36* (2013.01)

(56) References Cited

U.S. PATENT DOCUMENTS

| | | | |
|---|---|---|---|
| 4,094,767 A | 6/1978 | Gifford, II | |
| 4,160,720 A * | 7/1979 | Seader | C10G 1/02 201/31 |
| 4,187,672 A | 2/1980 | Rasor | |
| 4,213,826 A | 7/1980 | Eddinger et al. | |
| 4,265,736 A | 5/1981 | Thayer | |
| 4,306,961 A | 12/1981 | Taciuk | |
| 4,323,446 A | 4/1982 | Chervenak et al. | |
| 4,404,086 A | 9/1983 | Oltrogge | |
| 4,459,201 A | 7/1984 | Eakman et al. | |
| 4,561,966 A | 12/1985 | Owen et al. | |
| 5,536,488 A | 7/1996 | Mansour et al. | |
| 7,550,063 B2 | 6/2009 | Gawad | |
| 2011/0089084 A1* | 4/2011 | Lourenco | C10G 1/002 208/414 |
| 2011/0094940 A1 | 4/2011 | Weisselberg | |
| 2011/0206571 A1 | 8/2011 | Skinner | |

FOREIGN PATENT DOCUMENTS

| | | |
|---|---|---|
| GB | 977905 A | 12/1964 |
| JP | 2006104261 A | 4/2006 |

\* cited by examiner

CASCADING PROCESSOR

FIELD

There is described a cascading processor that was developed for using in processing oil sands for heat extraction of bitumen and a method of using the same. It will be appreciated that the cascading processor can be used for processing other types of materials.

BACKGROUND

Published patent application WO2010/115283 (Lourenco et al #1) entitled "Extraction and Upgrading of Bitumen from Oil Sands", describes a heat extraction and upgrading process, which provides a number of advantages over existing processes. Patent Cooperation Treaty application CA2011/05043 (Lourenco et al #2) entitled "Method to Upgrade Heavy Oil in a Temperature Gradient", describes a process which is focused upon heavy oil, not oil sands. If these types of heat extraction processes are to be used with oil sands, methods and apparatus must be developed which are better capable of handling highly abrasive oil sands, which cause wear mechanical product handling system.

SUMMARY

According to one aspect there is provided a cascading processor which includes a processor body having an upper inlet and a lower outlet, such that materials pass by force of gravity from inlet to the outlet. The processor body has a plurality of processing levels which are sequentially vertically spaced progressively downwardly from the inlet to the outlet, such that materials cascade by force of gravity from one processing level to another processing level as the materials pass through the processor body from the inlet to the outlet.

According to another aspect there is provided a method of processing materials including a step of passing the materials through a cascading processor having a processor body with an upper inlet and a lower outlet, such that the materials pass by force of gravity from inlet to the outlet. The processor body has a plurality of processing levels which are sequentially vertically spaced progressively downwardly from the inlet to the outlet, such that the materials cascade by force of gravity from one processing level to another processing level as the materials pass through the processor body from the inlet to the outlet.

The cascading processor and the associated method were developed to enable the efficient processing of abrasive oil sands. It will be appreciated that the cascading processor and the broadest aspect of the associated method can be used to process any material that is capable of flowing by force of gravity from one level to another.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A cascading processor and its method of operation will now be described with reference to FIG. 1 through 4. There will be used as an example the removal of bitumen from oil sands.

Figure 1:
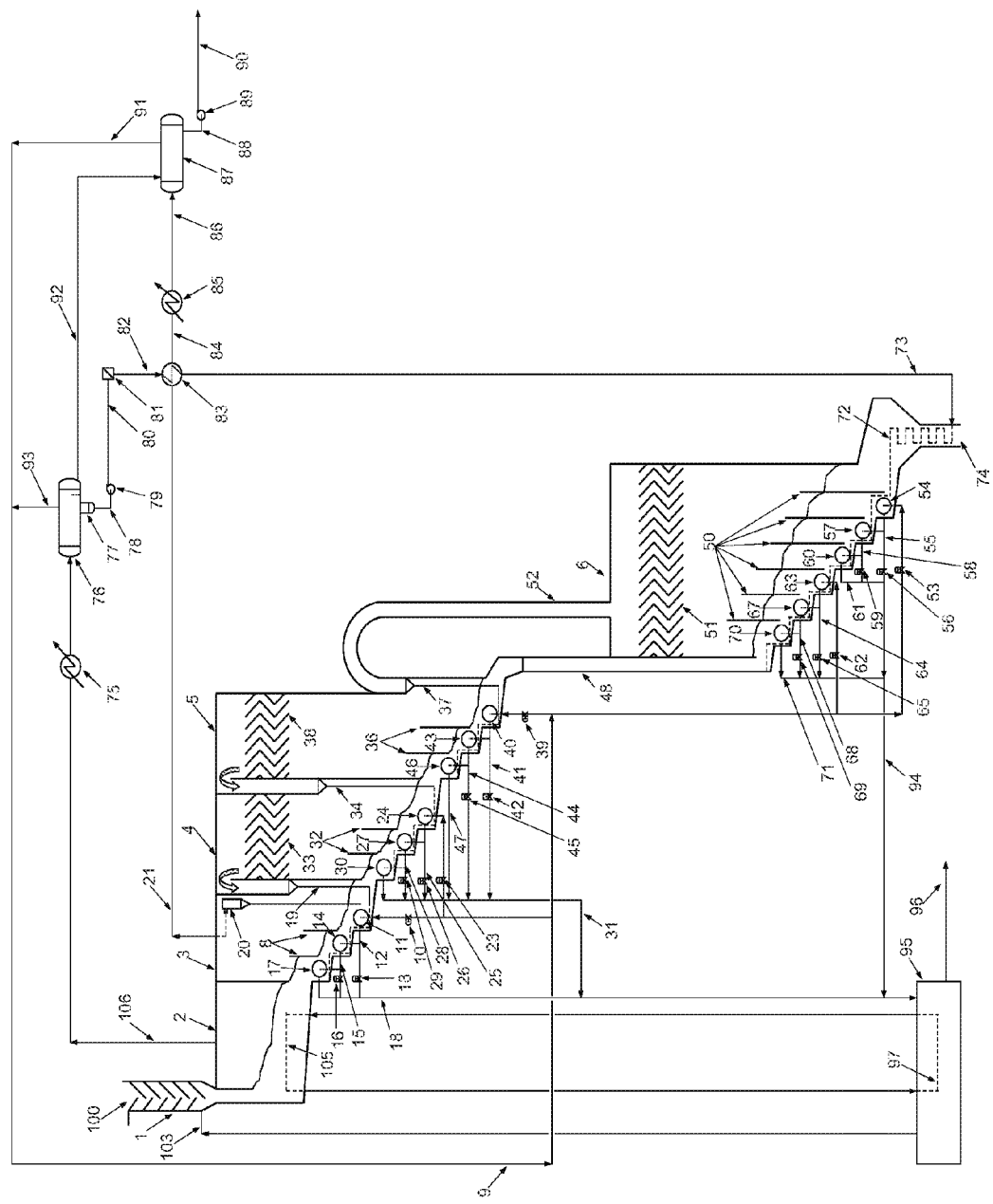
FIG. 1 is a flow diagram illustrating a method for processing oil sands to extract bitumen using the cascading processor.

Overview of Process:

The cascading processor provides a method to enable the extraction of water and oil from oil sands. The process main feature it's the ability to process large volumes of solids in a downwards cascading flow in a controlled temperature gradient. The second feature of the process is the intimate contact in each section by the countercurrent flow between the produced vapors and the oil bearing sands. The produced vapors are the sweeping gas stream and the oil bearing sands the reflux stream that quenches the exothermic reactions. As shown in FIG. 1, the oil sands processor has six distinct sections, numbered 1 through 6.

The first section, 1, is the deaeration section, it uses the waste heat of combustion flue gas streams to preheat and deaerate the oil sands.

The second section, 2, is the preheating section, it preheats the oil sands with a temperature controlled heat transfer fluid coil to evaporate all the water and lighter oil fractions with boiling points below the section controlled set temperature. The fractions with a boiling point greater than the preset temperature, cascade with the oil bearing sand to section three. The evaporated fractions from section 2 are cooled and separated into water, light oil fractions and fuel gas at separator 76. The water is recovered and processed to generate steam in steam generator 83. The condensed light oil fractions are recovered and added to the product stream in vessel 87. The separated fuel gas enters the process fuel gas header 9.

The third section, 3, is the flashing section, it has a bed immersed direct fired burner and a serpentine duct distributed into three zone in a upwards countercurrent flow to the cascading oil bearing sands. The bed level in each zone is controlled by longitudinal zone dividers. The temperature in the last zone of the section is controlled by combusting fuel gas in the immersed direct fired burner 11. The bed temperatures in the subsequent upward zones are controlled by the flow of flue gases to each serpentine duct. The immersed burner 11 can be a pulse burner with resonance tubes radiating an acoustic pressure that enhances the mixing of solids and vapors in each zone. The zone beds are fluidized by a distributed countercurrent flow of product vapors generated in sections downstream. The solvent properties of product vapors enhance mass transfer, pre-heat the sands, sweep the volatiles fractions and provide the hydrogen for hydrogenation reactions. Any condensed fractions from the sweeping gas flows back with the oil bearing sands into section four for further cracking. The pre-set temperature in section three establishes the product boiling end point. All the oil fractions with a boiling point less than the temperature set point enter a cyclone arrangement 20 to remove solid particles and is immediately quenched at heat exchangers 83 and 85 to prevent overcracking before entering the product separator. The produced sour fuel gas is separated in vessel 87 and routed to fuel gas header 9 to provide the energy requirements for the process. The condensed liquid fractions are the product which is stabilized to ensure saturation of olefins present. The oil fractions with a boiling point greater than section three preset temperature, flow with the sand into section four.

Section four, 4, is the oil cracking section. This section, also has a bed immersed direct fired burner 24 and a serpentine duct distributed into three zone beds in a upwards countercurrent flow to the cascading oil bearing sands. Again, the bed level in each zone is controlled by longitudinal zone dividers 32. The temperature in the last zone of the section is controlled by combusting fuel gas in the immersed direct fired burner 24. The temperature in the other two upward zones are controlled by control valves 26 and 27, the flue gases flow to each serpentine duct. The zone beds are fluidized by a distributed countercurrent flow 34 of product vapors generated in sections five, the solvent properties of product vapors enhance mass transfer, pre-heat the sands, sweep the volatiles fractions and provide the hydrogen for hydrogenation reactions in section four. Any condensed fractions from the sweeping gas flows back with the oil bearing sands into section five for further cracking. This mixture of cracked hydrocarbon vapors and sweep gas containing hydrogen rise to an upper catalytic zone 33 in section four, were vapour phase hydrogenation reactions occur. The hydrogenated vapour fractions leave the catalytic zone in section four as sweeping gas to section three distributor 19. The cascading and cooler oil bearing sands stream in section three acts as a reflux stream to quench the exothermic temperature of the hydrogenated sweeping gas from section four to prevent overcracking. Any condensing fractions from the sweeping gas flows with the oil bearing sands back into section four for further cracking. The objective of section four is to control the cracking temperature in each zone to maximize liquid yields and minimize the formation of coke. The oil fractions with a boiling point greater than the preset temperature of section four flow with the sand into section five.

Section five, 5, is the coking section. This section, also has a bed immersed direct fired burner 37 and a serpentine duct 43 and 46 distributed into three zone beds in a upwards countercurrent flow to the cascading oil bearing sands. Again, the bed level in each zone is controlled by longitudinal zone dividers. The temperature in the last zone of the section is controlled by combusting fuel gas in the immersed direct fired burner 37. The temperature in the other two upward zones are controlled by control valves 42 and 45, the flue gases flow to each serpentine duct. The zone beds are fluidized by a distributed 37 countercurrent flow of product vapors generated in sections six, primarily hydrogen and carbon dioxide, sweeping the cracked volatiles fractions and providing the hydrogen for hydrogenation reactions. The oil fractions, primarily asphaltenes, are cracked at more severe operating conditions to produce vapors and coke. The mixture of cracked hydrocarbon vapors and sweep gas rise to an upper catalytic zone 38 in section five, were vapour phase hydrogenation reactions occur. The hydrogenated vapour fractions leave the catalytic zone in section five as sweeping gas to section four distributor 34. The cascading and cooler oil bearing sands stream in section four acts as a reflux stream to quench the exothermic temperature of the hydrogenated sweeping gas to prevent overcracking. Any condensed fractions from the sweeping gas cascades with the oil bearing sands back into section five for further cracking. The section five operations temperature is set to meet coke production on demand.

The production of coke is a prerequisite carbon source to meet the production of hydrogen in section six. The mixture of sand and coke cascades through duct 48 into section six, the hydrogen generation section. This section, also has bed immersed direct fired burners 54 and 63, and serpentine ducts 57, 60, 67 and 70, distributed into six zone beds in a upward countercurrent flow to the cascading coke bearing sands. Again, the bed level in each zone is controlled by longitudinal zone dividers. The temperature in two zones of the section is controlled by combusting fuel gas in the immersed direct fired burners 54 and 63. The temperature in the other four upward zones are controlled by control valves 56,59, 65 and 69, the flue gases flow to each serpentine duct. A distributed stream of superheated medium pressure steam 72 fluidizes the beds and provide the hydrogen and oxygen source to react with the coke to produce a syngas stream of hydrogen and carbon dioxide. The vapour mixture of steam, carbon monoxide, hydrogen and carbon dioxide rises to an upper catalytic zone 51 were water gas shift reactions are completed. The syngas produced leaves the catalytic zone in section six as sweeping gas to section five distributor 37, providing the hydrogen for the process hydrogenation reactions. The temperature in section six is controlled by burners 54 and 63, to generate on demand the hydrogen requirements for the process by reacting the coke in the sand with superheated steam to produce hydrogen and carbon dioxide. The very hot and oil free sand leaving section six through duct 74, provide the thermal energy required to generate superheat steam in coil 72.

Operation:

Referring to FIG. 1, the cascading processor described above provides a process to recover and upgrade bitumen from oil sands. Oil sands have a typical composition 80-85% of sand and clay, 3-5% water and 10-15% bitumen, it is fed by stream 100 into deaeration column 1 where flue gases from stream 3 gives up its thermal energy to the mined oil sands to preheat and strip the air in the oil sands. The pre-heated and air stripped oil sands enters a downward sloped section 2 where the oil sands is further heated to temperatures greater than 100 C by an immersed heat transfer fluid coil 105. The temperature in section 2 is controlled to evaporate all the water present in the oil sands, the vaporized stream exits through line 106, cooled in cooling heat exchanger 75 and separated in separator 76. The separated hydrocarbon gases are routed through line 93 into the fuel gas header 9. The condensed and separated hydrocarbon liquids are routed through line 92 into Synthetic Crude Oil drum 87. The condensed water is collected in boot 77 and routed through line 78 to pump 79. The pressurized water stream is routed through line 80 to a membrane unit 81 to remove any dissolved solids that may be present. The cleaned water stream is generated into steam at heat exchanger 83 and routed through line 73 to a superheating steam coil 72. The water free, oil sands cascade through the sloped section 2 into section 3, where the temperature of the oil sands is increased in incremental steps through the three zones in section 3 to a maximum of 350 C. The section 3 has three zones, separated by longitudinal partitions 8, at each zone the temperature is increased to control vaporization and minimize cracking. The partitions control the bed level in each zone. At the bottom of each bed zone a distribution gas header 19 provides fluidization and volatiles stripping to the oil sands. The oil sands first cascades into heat exchanger 17 zone where the oil sands are heated by the counter current flue gas exiting heat exchanger 14 into heat exchanger 17. The temperature control into heat exchanger 17 is by flue gas temperature control valve 16. The acid flue gases exiting; heat exchanger 17 and temperature control valve 16 and 13 are routed through line 18 into sulphur recovery plant 95. The heated oil sands cascade from the sloped heat exchanger 17 zone into heat exchanger 14 zone where the temperature is further increased. The heat to heat exchanger 14 section is provided by the products of combustion of a bed immersed pulse burner heat exchanger 11, the temperature control in this zone is provided by flue gas temperature control valve 13. The oil sands temperature is further increased to a maximum of 350 C when it cascades into immersed pulse burner heat exchanger 11 zone. The temperature of the sand bed in pulse burner heat exchanger 11 is controlled by sour fuel gas control valve 10. The hydrocarbon vapors in section 3 having a boiling point of lower than 350 C rise to the top of section 3, are routed to cyclone 20 removing particulates trapped in the gaseous stream. The captured cyclone particulates are routed from the cyclone dip leg to pulse burner heat exchanger 11 zone sand bed. The gaseous product stream from cyclone 20 is routed to line 21, cooled in heat exchanger 83, through line 84 to trim cooler 85 and through line 86 into separator 87. The condensed hydrocarbons are routed through line 88 to pump 89 and through line 90 to the stabilization unit. The generated sour gases are routed through line 91 into sour fuel gas header 9. The oil sands now stripped of the hydrocarbon oil fractions with a boiling point of and less than 350 C cascade from the sloped section 3 into section 4 for further incremental heating. Section 4 also has three zones separated by longitudinal partitions 32, at each zone temperature is increased to control vaporization and cracking. The partitions in each zone control the zone bed depth. A gas distribution header 34 distributes and fluidizes the oil sands bed zones in section 4 this gas mixture contains catalysed hydrocarbon vapors generated in section 5 and hydrogen generated in section 6. The distribution gas also provides stripping for the volatiles generated in the bed zones of section 4 and the hydrogen required to meet hydrogen demand in catalytic zone 33. The cascaded oil sands stream from section 3 enters heat exchanger 30 zone and is heated by the flue gases exiting heat exchanger 27. The temperature in oil sands bed heat exchanger 30 section is controlled by flue gas temperature control valve 29. The acid flue gas exits; heat exchanger 30 zone, acid flue gas temperature control valves 29 and 26, to line 31 and onto sulphur recovery plant 95. The oil sands cascade to heat exchanger 27 zone, are further heated by the flue gases leaving pulse burner heat exchanger 24 into heat exchanger 27. The oil sands bed temperature in this zone is controlled by flue gas temperature control valve 26. The oil sands cascades from heat exchanger 27 zone into pulse burner heat exchanger 24 zone to a maximum temperature of 450 C. The oil sands bed temperature in this section is controlled by fuel gas valve 23. Cracking will commence in section 4 in the presence of nascent hydrogen and natural clays. The natural clays have catalytic properties and are a major component in the oil sands. The clay concentration in the oil sands can vary from 15 to 40% by wt. The objective in section 4 is to take advantage of the natural catalytic properties of the clays and in the presence of nascent hydrogen, hydrogenate the oil fractions as they are thermally cracked. The cascading cooler oil sands fractions provide a reflux stream behaviour to absorb the heat generated by the exothermix reactions. To further enhance and stabilize the cracked and rising vaporized oil fractions a channel catalytic zone 33 atop section 4 is provided. The catalytic processed vapors exit section 33 into gas distribution header 19 where it is cooled in a bed of cascading oil sands. The partially cracked oil sands stream cascades from section 4 into section 5 to complete the cracking process. Section 5 also has three zones separated by longitudinal partitions 36, at each zone the temperature is increased to control vaporization and cracking. A gas distribution header 37 provides a gaseous stream of carbon dioxide and hydrogen to fluidize the oil sands bed in each zone and strip the volatiles generated in each zone. The hot oil sands stream cascades from sloped section 4 into section 5 heat exchanger 46 zone. The oil sands temperature is increased by the flue gas leaving heat exchanger 43 into heat exchanger 46. The oil sands bed temperature in heat exchanger 46 zone is controlled by flue gas temperature control valve 45. The acid flue gas exiting; heat exchanger 46 and temperature control valves 45 and 42 is routed to flue gas header 31 to sulphur recovery plant 95. The oil sand stream cascades from heat exchanger 46 zone into heat exchanger zone 43. The oil sands bed temperature in heat exchanger 43 zone is controlled by flue gas temperature control valve 42. The oil sands cascades into pulse burner heat exchanger 40 zone which controls the operations temperature severity for the production of coke. The temperature in oil sands bed of pulse burner heat exchanger 40 zone is controlled by fuel gas valve 39. The production of coke is controlled by the hydrogen requirements for hydrogenation reactions in the process. Coke and superheated steam are the reactants required to generate carbon dioxide and hydrogen in section 6. The control of operation severity in section 5 is determined by coke production requirements. In section 5, the remaining hydrocarbons in the oil sands stream are thermally cracked, in the presence of natural catalytic clays, hydrogen and carbon dioxide, rising to the top of section 6 into catalytic zone 38 for stabilization. The catalyzed vapors exit zone 38 into distribution header 34 in section 4, were they are quenched by the cooler cascading oil sands. Some of the asphaltenes fraction of the bitumen in the oil sands are converted into coke in this section, the production of coke is controlled by temperature control of pulse burner heat exchanger 37 to meet the carbon source requirements to produce hydrogen in section 6. The mixture of sand, clays and coke cascades through line 48 into section 6, the hydrogen generation section. Section 6 has 6 zones separated by partitions 50, at each zone the temperature is increased to control the gasification and water gas shift reactions to produce hydrogen and carbon dioxide. The zones are sloped to provide a continuous cascading flow of the solids through an increasing temperature range to ensure that all the coke present in the sand and clay mixture is converted through gasification and water gas shift reactions into hydrogen and carbon dioxide in the presence of superheated steam. The section has two pulse burners heat exchangers and four flue gas heat exchangers immersed in the sand and clay bed to provide the thermal energy required to convert the coke and superheated steam into hydrogen and carbon dioxide. The steam is supplied through line 73 and superheated in coil 72 by the thermal energy available in the processed sand and clay fractions exiting the section 6 through channel 74. The superheated steam is distributed into all 6 bed zones to fluidized the beds and react with the coke generated in section 5 to form hydrogen and carbon dioxide. The gasification and water gas shift reactions are enthothermic, the energy required to control the temperature required for these reactions are provided by the combustion of sour gas controlled by temperature control valves 53 and 62 to bed immersed pulse burners 54 and 63 and associated flue gas heat exchangers 57, 60 and 67, 70 respectively. The mixture of hydrogen, carbon monoxide, carbon dioxide and steam vapors rise to the to the top of section 6 and passes through catalytic zone 51 to stabilize the carbon monoxide fractions into hydrogen and carbon dioxide.

Figure 2:
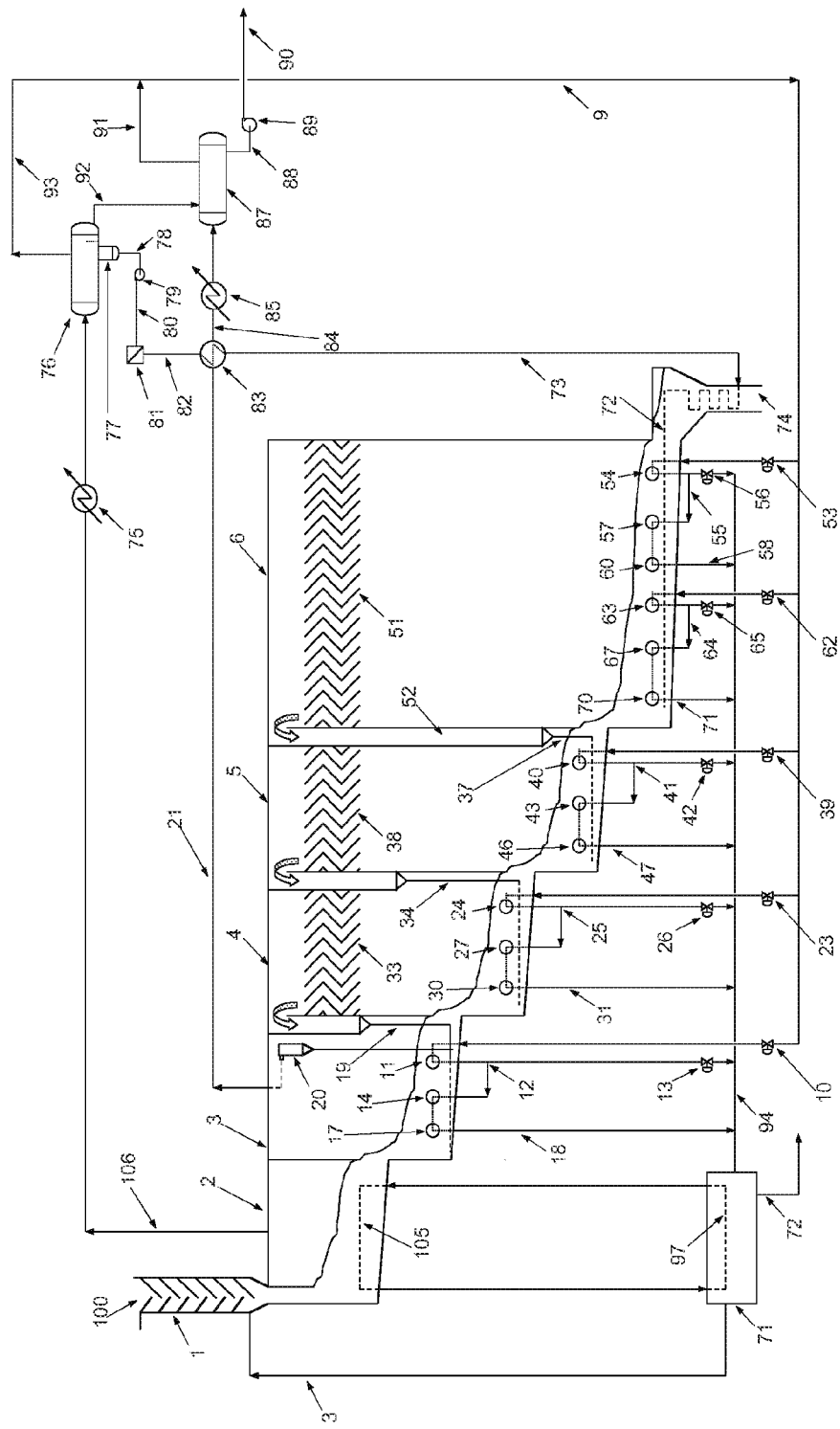
FIG. 2 is a flow diagram illustrating the cascading processor of FIG. 1, with a variation in the lowermost processing level.

Variations:

Referring to FIG. 2, a variation is illustrated in which the arrangement of section 6 has a lower slope than FIG. 1.

Figure 3:
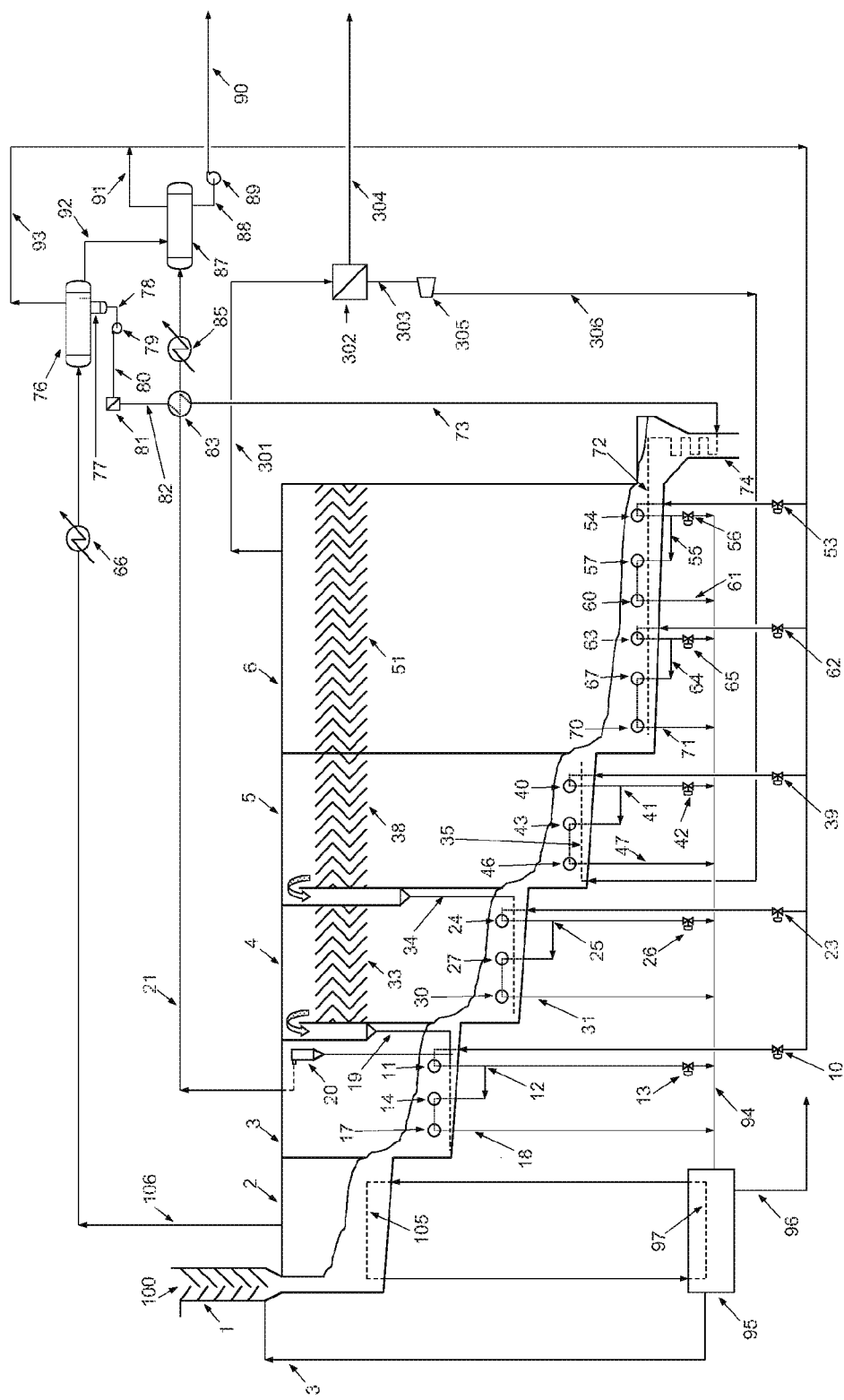
FIG. 3 is a flow diagram illustrating the cascading processor of FIG. 1, with a variation to separate and compress hydrogen.

Referring to FIG. 3, a variation is illustrated in which the hydrogen and carbon dioxide generated in section 6 is routed through line 301, cooled and separated in membrane 302. The concentrated hydrogen stream 303 is compressed and routed through header 306 to section 5 for bed fluidization, stripping and hydrogenation reactions.

Figure 4:
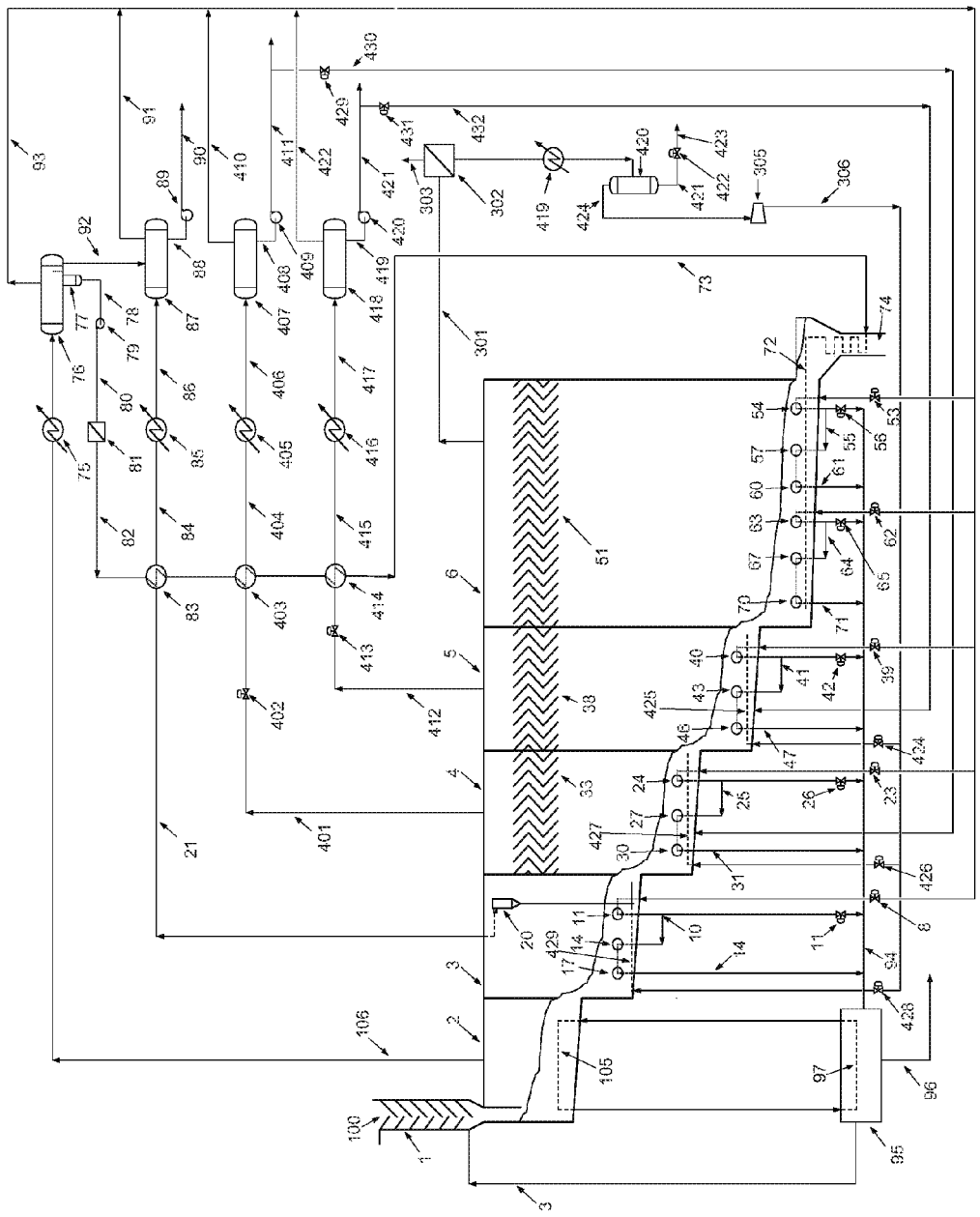
FIG. 4 is a flow diagram illustrating the cascading processor of FIG. 1, with a variation to compress and control the addition of hydrogen and allow for separation and production of heavier fractions.

Referring to FIG. 4, a variation is illustrated in which the hydrogen and carbon dioxide generated in section 6 is routed through line 301 cooled and separated in membrane 302. The concentrated hydrogen is compressed to hydrogen header 306 for flow control distribution into sections; 5,4 and 3, through valves 424, 426, and 428, providing better control of hydrogen addition to each section. Moreover, FIG. 4 also provides the ability to process and produce a tailored product stream by controlling the products generated in sections 3, 4 and 5. Each section vapour product is cooled and separated in a dedicated product stream loop. As an example, a portion of the higher boiling point vapour fractions of section 5 can be removed by flow control valve 413 through line 412, cooled in heat exchanger 414 and 416, and condensed in separator 418. This process variation provides an option to meet various product slates. Any excess of higher boiling point fractions can be recycled through flow control valves 429 and 431 for further cracking.

Advantages:

The above described approach provides a number of advantages:

it eliminates the use of water as per the current practice in recovering bitumen from oil sands.

it eliminates or substantially reduces the use of an external fuel such as natural gas.

it eliminates the storage and containment of toxic water streams as per existing practices.

it eliminates the use of natural gas for the extraction of bitumen from tar sands.

the fuel gas generated in the process is used as the fuel source for the pulse heat exchanger, while recognizing that any other fuel can be employed.

As shown the process has a wide range for temperature requirements in each section. The temperature ranges demonstrated in FIG. 1 are but a mode of operation selected for the example cited. These can vary according to feed composition and desired products.

The process as shown is not limited to its use in processing oil sands. It can also be employed to process, shale oil, biomass or any organic fuel derived matter. When the processor is employed to process biomass, there is the option of employing a fixed bed height from inert materials such as sand, whereas the biomass cascades over the partitions as an overflow into each zone versus the mode of operation in the oil sands processor where the partition controls an underflow into each zone. The processor is particularly suitable to handle any solids and extract its organic matter as fuels over a wide range of operations conditions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given the broadest interpretation consistent with the description as a whole.

What is claimed is:

1. A cascading processor, comprising:
a processor body having a downwardly sloped flow path with an upper inlet and a lower outlet, such that materials pass by force of gravity down the sloped flow path from the inlet to the outlet, the processor body having a plurality of processing levels that are sequentially horizontally and vertically spaced progressively downwardly from the inlet to the outlet, such that materials cascade by force of gravity from one processing level to another processing level as the materials pass through the processor body from the inlet to the outlet;
each processing level being enclosed with the exception of an ingress spillway and an egress spillway to provide independently controlled operating conditions on each processing level; and
each processing level having a progressively increasing temperature gradient created by a heat source that is immersed in the materials and a counterflow of gas produced from the materials in downstream processing levels.

2. The cascading processor of claim 1, wherein the heat source is one or more pulse burners that burn a fuel gas.

3. The cascading processor of claim 1, wherein the heat source is one or more heating coils.

4. A method of processing materials that flow, comprising:
passing the materials through a cascading processor having a processor body with an upper inlet and a lower outlet, such that the materials pass by force of gravity from the inlet to the outlet, the processor body having a plurality of processing levels that are sequentially vertically spaced progressively downwardly from the inlet to the outlet, such that the materials cascade by force of gravity from one processing level to another processing level as the materials pass through the processor body from the inlet to the outlet, wherein passing the materials through the cascading processor comprises:
passing the materials through a vaporizing processing level that has a temperature above the boiling point of water and below a hydrocarbon cracking temperature and removing vaporized water and hydrocarbons from the vaporizing processing level; and
passing the materials through a cracking processing level downstream of the vaporizing processing level, the cracking processing level having a temperature above the hydrocarbon cracking temperature and removing cracked hydrocarbons from the cracking processing level.

5. The method of claim 4, wherein the materials are oil sands which are being processed to remove bitumen.

6. The method of claim 5, wherein each processing level has independently controlled operating conditions, with a progressively increasing temperature gradient and the following steps are performed sequentially as the oil sands pass from one processing level to another processing level:
removing air and water from the oil sands;
removing hydrocarbon fractions with a boiling point less than 350 C from the oil sands;

removing hydrocarbon fractions with boiling points from 350 C up to 450 C from the oil sands in the presence of hydrogen and catalysts;

cracking remaining hydrocarbon fractions in the oil sands in the presence of hydrogen and catalysts; and generating hydrogen by reacting coke with superheated steam in the presence of catalysts.

7. The method of claim 4, wherein each processing level has independently controlled operating conditions.

8. The method of claim 4, wherein each processing level has a progressively increasing temperature gradient.

9. The method of claim 4, wherein each processing level is heated by a heating coil through which a heated fluid circulates.

10. The method of claim 4, further comprising the steps of:

separating water from the vaporized water and hydrocarbons removed from the vaporizing processing level;

generating a stream of steam from the separated water; and injecting the stream of steam into the cracking processing level as a hydrogen source for cracking hydrocarbons.

11. The method of claim 4, further comprising the step of deaerating the material by preheating the material to a temperature that is less than the boiling point of water and stripping the air from the material upstream of the vaporizing processing level.

12. The method of claim 4, wherein the processing levels are sequentially horizontally and vertically spaced progressively downward from the inlet to the outlet to define a sloped flow path from the inlet to the outlet.

13. A cascading processor, comprising:

a processor body having an upper inlet and a lower outlet, such that materials pass by force of gravity from the inlet to the outlet, the processor body having a plurality of processing levels that are sequentially vertically spaced progressively downwardly from the inlet to the outlet, such that materials cascade by force of gravity from one processing level to another processing level as the materials pass through the processor body from the inlet to the outlet, the plurality of processing levels comprising:

a vaporizing processing level that has a temperature above a boiling point of water and below a hydrocarbon cracking temperature, the vaporizing processing level having a vapor outlet for removing vaporized water and hydrocarbons from the vaporizing processing level; and a cracking processing level downstream of the vaporizing processing level, the cracking processing level having a temperature above the hydrocarbon cracking temperature, the cracking processing level having a cracked hydrocarbon outlet for removing cracked hydrocarbons from the cracking processing level.

14. The cascading processor of claim 13, wherein each processing level is enclosed to form a section with an ingress spillway and an egress spillway that facilitate movement of oil sands from one processing level to another processing level.

15. The cascading processor of claim 13, wherein the materials are heated by combusting fuel gas in immersed pulse burners, providing temperature control on demand as the materials cascade through the processor body.

16. The cascading processor of claim 13, wherein the materials are heated by heating coils which become immersed in the materials, as the materials cascade through the processor body.

17. The cascading processor of claim 13, further comprising:

a water separator that separates water from the vapor outlet of the vaporizing processing level; and a steam generator that generates a stream of steam from the separated water, the stream of steam being injected into the cracking processing level as a hydrogen source for cracking hydrocarbons.

18. The cascading processor of claim 13, further comprising a deaeration processing level upstream of the vaporizing processing, the deaeration processing level preheating the material and stripping the air from the material prior to entering the level, the deaeration processing level having a temperature that is less than the boiling point of water.

19. The cascading processor of claim 13, wherein the processing levels are sequentially horizontally and vertically spaced progressively downward from the inlet to the outlet to define a sloped flow path from the inlet to the outlet.

* * * * *

UNITED STATES PATENT AND TRADEMARK OFFICE
CERTIFICATE OF CORRECTION

PATENT NO. : 9,511,935 B2  
APPLICATION NO. : 14/350043  
DATED : December 6, 2016  
INVENTOR(S) : J. Lourenco et al.

Page 1 of 1

It is certified that error appears in the above-identified patent and that said Letters Patent is hereby corrected as shown below:

On the Title Page

| Column | Line | Error |
| --- | --- | --- |
| (73) | Assignees; | "1304345 Alberta Ltd., Edmonton (CA);" should |
| Column 1 | 1st assignee | read --1304342 Alberta Ltd., Edmonton (CA);-- |
| (57) | Abstract | "front" should read --from-- |
| Column 2 | 10 of text | |

Signed and Sealed this  
Twenty-fifth Day of April, 2017

Michelle K. Lee  
*Director of the United States Patent and Trademark Office*